United States Patent [19] [11] 4,044,638
Heffron et al. [45] Aug. 30, 1977

[54] CRANKSHAFT MACHINE STOCK AND CHUCK APPARATUS

[75] Inventors: Allan J. Heffron, Freeland; Leverne H. Kennedy, Saginaw, both of Mich.

[73] Assignees: Crankshaft Machine Company, Jackson; C. M. Systems, Incorporated, Bay City, both of Mich.

[21] Appl. No.: 671,317

[22] Filed: Mar. 29, 1976

Related U.S. Application Data

[63] Continuation of Ser. No. 519,501, Oct. 31, 1974, abandoned.

[51] Int. Cl.² .............................................. B23B 5/18
[52] U.S. Cl. ......................................... 82/9; 82/40 R; 279/121
[58] Field of Search ........................ 82/9, 40 A, 40 R; 279/121

[56] References Cited

U.S. PATENT DOCUMENTS

| | | | |
|---|---|---|---|
| 1,748,672 | 2/1930 | Groene | 82/40 A |
| 1,780,390 | 11/1930 | Hopkins | 82/40 A |
| 1,878,130 | 9/1932 | Groene | 82/40 A |
| 1,878,131 | 9/1932 | Groene | 82/40 A |
| 1,934,975 | 11/1933 | Groene | 82/40 A |
| 2,612,378 | 9/1952 | Highberg | 279/121 |
| 3,610,645 | 10/1971 | Roddy | 279/121 |

*Primary Examiner*—Leonidas Vlachos
*Attorney, Agent, or Firm*—Beaman & Beaman

[57] ABSTRACT

Headstock and tailstock chucking apparatus for crankshaft machine tools, such as lathes and grinders, utilizing a centering hole defined in the crankshaft workpiece end for axially locating the workpiece relative to the machine, and the machining tools. The stock spindle chucks utilize a center engaging a previously located and dimensioned workpiece center to axially position the workpiece, which is biased into firm engagement with the center prior to chucking. The chuck center and workpiece is axially located and spindle motors reciprocate chuck actuating mechanism sequentially producing axial locking and radial chucking of the workpiece. Further, automatic limit switch positioning apparatus is employed to automatically position machine limit switch controls in accordance with workpiece dimensions and quill location.

8 Claims, 11 Drawing Figures

CRANKSHAFT MACHINE STOCK AND CHUCK APPARATUS

This is a continuation of application Ser. No. 519,501, filed Oct. 31, 1974 and now abandoned.

BACKGROUND OF THE INVENTION

The invention pertains to the field of locating and chucking crankshaft workpieces within crankshaft machine tools.

In the manufacture of internal combustion engine crankshafts the crankshaft is formed by casting or forging to define the main and crank bearings, counterweights and other components of the crankshaft. The rough castings or forgings are then usually preliminarily machined to roughly size the bearings and to define chucking surfaces, or location surfaces, and then placed in a crankshaft lathe wherein the bearing surfaces are turned. After the lathe work, the crankshafts are usually transferred to finish grinding machines, and the bearing surfaces are ground, and sometimes burnished, to produce the final bearing finish.

Internal combustion engine crankshafts must be accurately machined, and heretofore one of the difficult problems encountered in crankshaft machine tools, particularly those of an automatic, or semi-automatic operation, lies in the accurate axial locating of the crankshaft workpiece in the machine tool chucks and subsequent securement when machining forces are applied. Of course, the positioning of the workpiece within the chucks will determine the axial location of the cutting operations occurring on the workpiece, and previous systems for axially locating and securing the crankshaft workpiece in the chucks often permitted inaccuracies resulting in the scrapping of the workpiece producing expensive material and time losses.

BRIEF DESCRIPTION OF THE INVENTION

It is an object of the invention to provide spindle and chucking apparatus for crankshaft machines wherein a crankshaft workpiece is very accurately axially and radially located within the machine chucks prior to chucking, even when the workpiece is automatically loaded into the machine tool chucks.

A further object of the invention is to utilize a method of axially positioning a crankshaft workpiece within a machine tool utilizing a centering hole in the workpiece for axial positioning.

An additional object of the invention is to provide a crankshaft stock and chucking apparatus which automatically axially positions the workpiece in the chucks, locks the workpiece in an axial direction prior to radially chucking, and provides a visual indication that axial workpiece locking has occurred.

A further object of the invention is to provide crankshaft machine stock and chucking apparatus automatically actuated by fluid motor means controlled by electric and pressure limit switches, and wherein the position of the limit switches is automatically varied in accordance with adapting the chucking apparatus for a particular workpiece.

Further, an object of the invention is to provide crankshaft machine stock and chucking apparatus utilizing cam surface operated jaws and plungers wherein rapid traverse and slow traverse cam surfaces are employed to produce locking angles and heavy clamping forces when jaws are clamped and to produce varying velocities of chuck jaw traversing although the actuating motor produces a relatively constant velocity power stroke.

In the practice of the invention crankshaft machine headstock and tailstock structure includes chucks each having axially positionable elements for engaging the ends of the crankshaft workpiece. The tailstock element includes a center engaging a prelocated and predimensioned center hole in the workpiece, and this center functions to axially position the workpiece relative to the machine tool. The tailstock center is positively locked with respect to its associated chuck, and the workpiece is axially biased into engagement with the center and is axially locked prior to workpiece jaw holding members defined in the chucks engaging the workpiece.

The positive locking of the chuck axially moving elements, and the jaw operation, is produced by a single actuator associated with each spindle which produces an axial movement. Cam surfaces defined upon jaws, pins and plungers produce a sequential locking and workpiece holding, and the jaws utilize cam surfaces of variable angular orientation to produce rapid and slow traverse sequential movement, as well as locking angle conditions and heavy clamp forces when jaws are clamped.

Hydraulic expansible motors are employed to produce actuation of the chuck components, and control of the fluid motors includes electric limit switches operated by a control element mounted upon the chuck actuating rods. The position of the limit switches is automatically adjustable through a switch carriage plate automatically positioned by quill adjustment rings whose position varies in accord with the adjustments made to the quill to accommodate various lengths of crankshaft workpieces. Accordingly, the limit switch positioning is automatically achieved when making workpiece adjustments to the chuck structure.

BRIEF DESCRIPTION OF THE DRAWINGS

The aforementioned objects and advantages of the invention will be appreciated from the following description and accompanying drawings wherein:

FIG. 6 is a front, elevational view of the headstock chuck as taken from the right of FIG. 5, FIGS. 7 and 8 are detail, sectional views taken through the chuck jaw cam structure along section VII—VII of FIG. 6, FIG. 7 illustrating the relative position of the cam surfaces during slow traverse, and FIG. 8 illustrating the cam surfaces during rapid traverse.

DESCRIPTION OF THE PREFERRED EMBODIMENT

Figure 1:
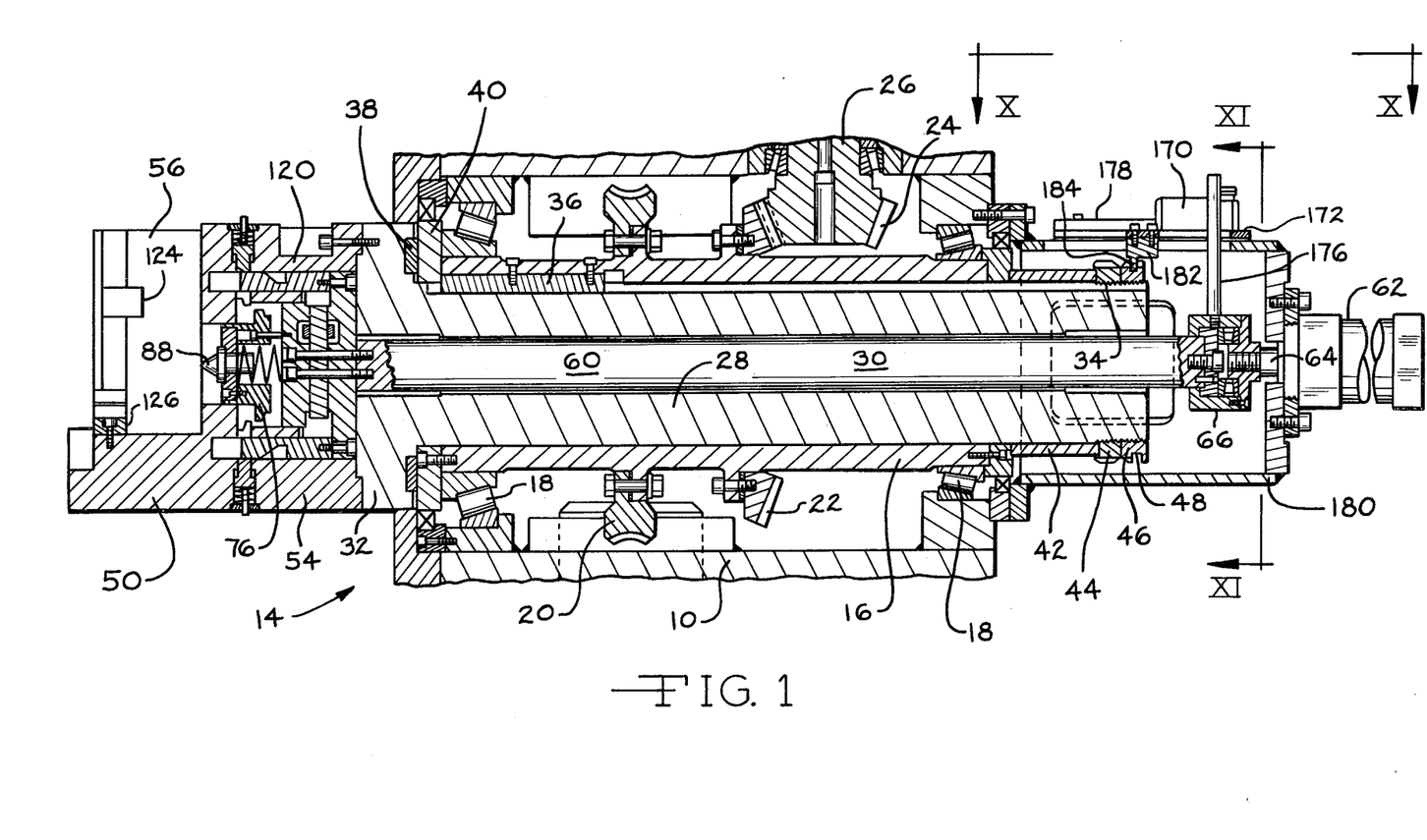
FIG. 1 is an elevational, sectional, diametrical view of a crankshaft machine tailstock spindle and chuck in accord with the invention illustrating the chuck apparatus in the unlocked position and prior to receiving a crankshaft workpiece.

A crankshaft machine tool utilizing the headstock, tailstock and chucking apparatus of the invention may be of relatively conventional form which includes a frame, generally indicated at 10, FIG. 1. The machine tool frame supports the headstock struction 12, and the tailstock structure 14 is in spaced relationship thereto wherein the axes of rotation of the headstock and tailstock are coincident, and sufficient spacing exists between the stocks to permit the crankshaft workpiece to be placed therebetween. The machining tools, such as turning tools, not shown, are mounted upon the frame 10 upon suitable carriage means for moving radially with respect to the axis of the head and tailstocks for engagement with the workpiece. Conventional motor and drive means are associated with the head and tailstocks, and the machining tools, to permit the cutting action, and suitable guides, templets, master cranks, and other conventional crankshaft machining apparatus are mounted upon the frame, not shown, and constitute no part of the present invention.

The spindle structure for the headstock and tailstock is substantially identical and the general construction thereof will be appreciated from FIG. 1. The spindle 16 is of tubular configuration and is rotatably mounted upon the machine frame 10 by roller bearings 18 and the spindle is rotated through an annular worm wheel 20 driven by a worm gear, not shown, rotated by the machine drive motor, not shown. An annular ring gear 22 is also mounted upon the spindle 16 engaging the gear 24 mounted upon shaft 26 which is connected to the master crankshaft, and is part of the drive mechanism for syncronizing the rotation of the spindles and crankshaft workpiece with the cutting tool movement, as is known, for instance see U.S. Pat. No. 3,808,653. Suitable oil seals are utilized with the spindle to retain the lubricating oils surrounding the spindle.

The elongated quill 28 is received within the spindle 16 and includes a central bore 30, an enlarged diameter head portion 32 and threads 34. The quill is keyed to the spindle for rotation therewith by key 36, and the axial orientation and position of the quill to the spindle is determined by the split spacer ring 38 interposed between the quill head portion 32 and the spindle ring 40, and the split spacer sleeve 42 and the locking ring nuts 44 and 48 threadedly mounted upon the quill threads 34. Thus, it will be appreciated that by utilizing spacers 38 and 42 of different dimension in the axial direction of the quill the axial position of the quill 28 may be adjusted relative to the spindle 16 to accommodate various lengths of crankshaft workpieces which are to be machined. The locking ring nut 44 is brought into an abutting engagement with the right end of the spacer sleeve 42, and ring nut 46 is provided with an annular groove 48 for a purpose to be later described.

The headstock and tailstock chuck apparatus is mounted upon the head portions 32 of the quills. The tailstock chuck is represented at 50 in FIG. 1, and the headstock chuck will be apparent at 52 in FIG. 5. The crankshaft workpiece jaw holding means for both headstock and tailstock structures is identical, as is the chuck actuating means and limit switch controls. Likewise, both chucks employ substantially similar apparatus for locking and releasing the workpiece axial positioning support elements, but different components are used in the chuck support elements themselves.

With reference to FIGS. 1 through 4, the tailstock chuck apparatus will be apparent. The chuck 50 includes a casing 54 of cylindrical configuration having an open left end, which faces toward the headstock 12, and is provided with an access opening 56, FIG. 3, radially related to the axis of chuck rotation. The chuck is internally recessed to slidably receive a drive block 58 attached to the end of the actuator rod 60 extending through the bore of the spindle 16. The actuator rod is operably connected to an expansible motor 62 operated by pressurized hydraulic fluid, and the piston 64 of the motor is attached to the rod 60 by a rotary connection 66 wherein the rotation of the rod 60 is not transferred to the piston rod.

The transversely disposed pin 68 formed in drive block 58 pivotally supports an equalizing bar 70 provided with spherical bearing surfaces at each end received within notches 72 defined in the jaw operating plungers 74. The plungers 74 extend in a direction parallel to the axis of the spindles and quills and are slidably received within bores defined in the chuck on opposite sides of the access opening 56 as appreciated from FIG. 3.

Figure 2:
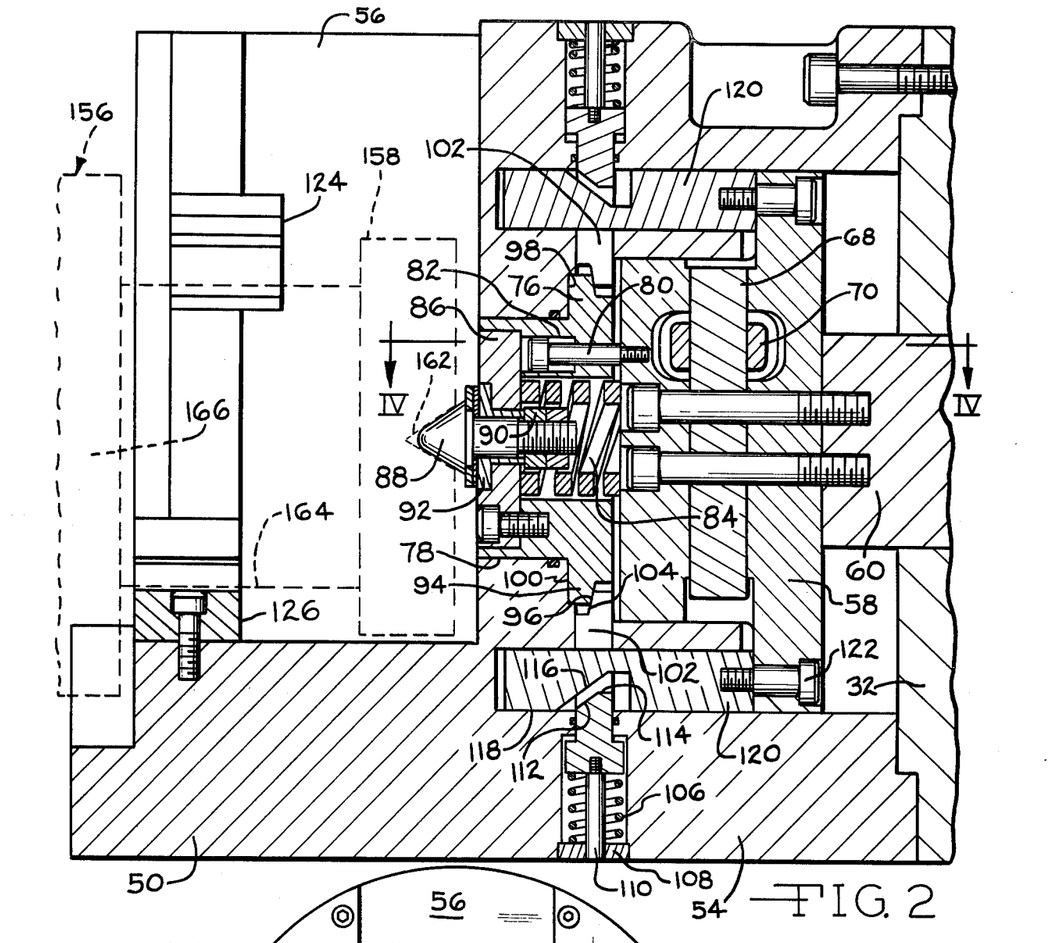
FIG. 2 is an enlarged, detail, diametrical cross-sectional view of the tailstock chuck illustrating the center in the locked position.
Figure 3:
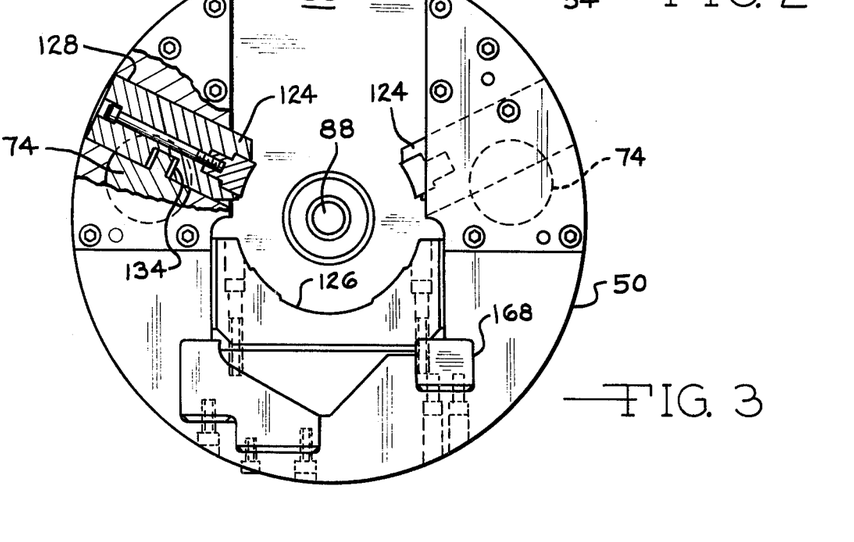
FIG. 3 is an elevational end view, partially in section, of the tailstock chuck as taken from the left of FIG. 2.
Figure 4:
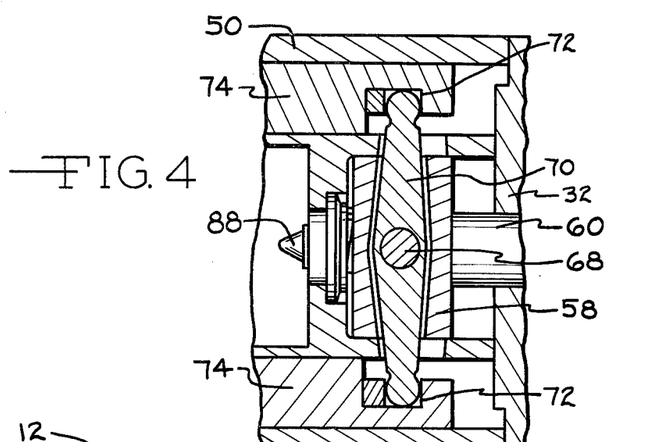
FIG. 4 is a detail, plan, sectional view taken through the clamping equalizing bar along section IV—IV of FIG. 2.

The support element 76 of the tailstock is coaxially mounted within the chuck 50 in a cylindrical bore 78 whereby the support element is capable of axial reciprocation in the chuck to a limited degree as will be apparent from the relative positions of the element 76 as shown in FIGS. 1 and 2. The supporting element is connected to the drive block through a lost motion connection provided by a plurality of headed bolts 80 reciprocable within enlarged blind holes 82. A compression spring 84 is interposed between the drive block 58 and the support element plate 86 in which the center 88 is mounted. The center 18 includes a threaded stud upon which lock nuts 90 are threaded and engage the center bushing 92, FIG. 2.

The support element 76 is provided with an annular flange 94 which includes a conical cam surface 96 diverging in a direction away from the center 88. The flange 94 also includes a radial locking surface 98 adapted to engage the locating surface 100 defined on the chuck. When the surfaces 98 and 100 engage, as in FIG. 2, the support element 76 is axially positioned in the chuck in its operating position.

Locking of the support element 76 is achieved by a pair of radially displaceable locking pins 102 slidably received within radial bores defined in the chuck. The locking pins 102 each include a cam surface 104 complementary in configuration to the surface 96, and of such dimension that radial inward movement of the pins to engage the surfaces 96 and 104 forces the surfaces 98 and 100 into engagement as shown in FIG. 2.

The pins 102 each include a head, and are biased radially inward by compression spring 106 interposed between the heads and an annular threaded plug 108. An indicating pin 110 extends from the locking pin heads through a hole defined in the plug 108 when the pins 102 are in the retracted position as shown in FIG. 1. The extension of the pins 110 from the plugs is readily visible to the machine operator.

The locking pins 102 are each provided with cam surfaces 112 and 114 engageable with cam surfaces 116 and 118 defined upon the plungers 120. The plungers 120 are each longitudinally reciprocable within bores defined in the chuck 50 parallel to the axis of chuck rotation. Screws 122 affix the plungers to the drive block 58 wherein the plungers will reciprocate with the drive block and rod 60. Extension of the rod 60 into the chuck, FIG. 2, permits the pin cam surface 112 to separate from the plunger cam surface 116 and the pins 102 will be biased inwardly by the springs 106 to engage the cam surface 104 with surface 96, and the surfaces 98 and 100 engage holding the support element 76 in its fixed predetermined axial position.

When the rod 60 is moved to the right, FIG. 2, the plunger cam surface 116 engages the pin cam surface 112 radially moving the pins 102 outwardly until the pin cam surfaces 114 ride upon the plunger cam surfaces 118, as shown in FIG. 1, producing maximum retraction of the pins 102, and permitting the support element 76 to move toward the right with the rod upon the heads of bolts 80 bottoming. Of course, bolts 80 are of sufficient length to permit pins 102 to retract before the bolt heads bottom.

The crankshaft holding means consists of a pair of movable jaws 124 substantially radially disposed to the axis of chuck rotation, and a positioning pillow 126 which engages a portion of the crankshaft workpiece remote from the end thereof. The jaws 124 reciprocate within bores 128 defined in the chucks, and include removable inserts which directly engage the workpiece. Each of the jaws is provided with a cam slot of a configuration which will be appreciated from FIGS. 7 and 8. The cam slots include the rapid traverse surfaces 130 and 132, and the slow traverse locking surfaces 134 and 136. As will be appreciated from FIGS. 7 and 8, the angular relationship of the rapid traverse surfaces and the slow traverse surfaces to the axis of the actuating plungers 74 differ in order to produce the variable rates of jaw movement and the locking forces required.

Figures 6, 7, 8:
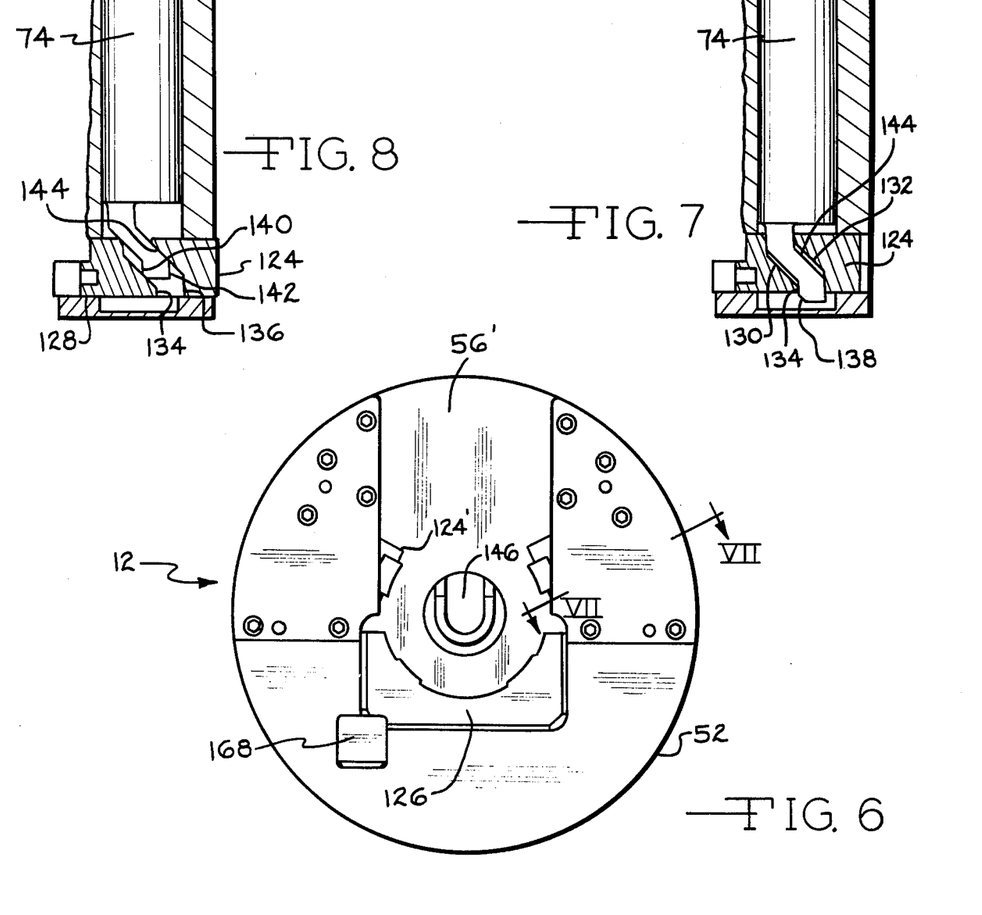
Figure 9:
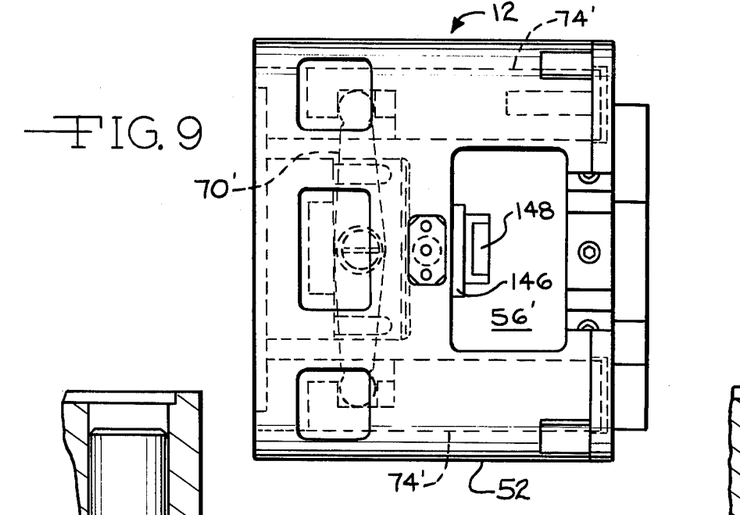
FIG. 9 is a top plan view of the headstock chuck as taken from the top of FIG. 6.

The jaws 124 are each actuated by a plunger 74 axially translated by the equalizing bar 70. The plungers 74 each include a cam surface 138, which engages the cam surfaces 130 during initial jaw movement inwardly during rapid traverse and cam surface 140 engages surface 134 during slow traverse inwardly and locking. The cam surface 142 engages the jaw surface 136 during initial slow retraction of the jaws and cam surface 144 engages 132 during rapid retraction of the jaws.

The headstock spindle, quill and chuck structure is in many respects similar to the structure of the tailstock, and identical, or equivalent, components are indicated by primed reference numerals.

In the headstock chuck 52, the support element 146, rather than constituting a center support, has a U-shaped cradle 148 defined thereon, FIG. 6, adapted to receive the opposite end of the crankshaft workpiece.

Figure 5:
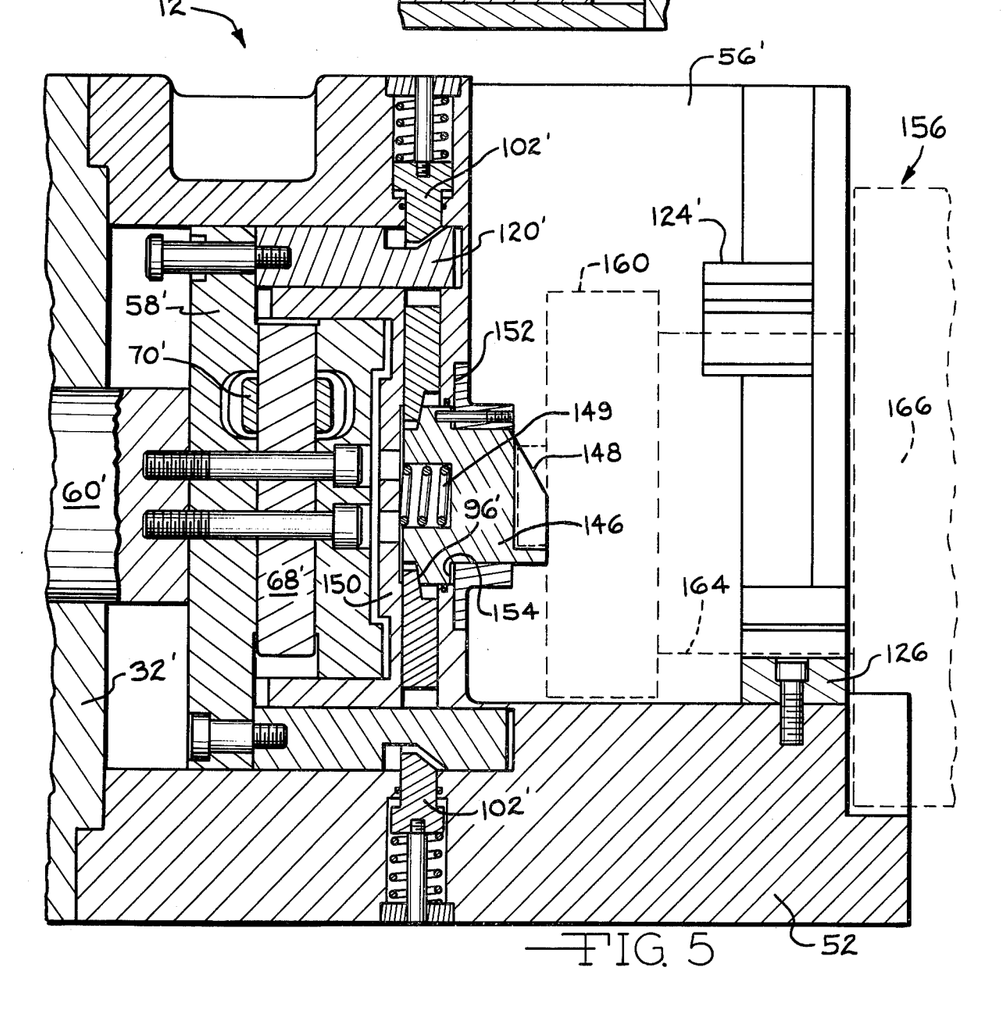
FIG. 5 is an enlarged, detail, diametrical sectional view of the headstock chuck with the cradle element shown in the locked position.

Axial reciprocation of the support element 146 is less than that of the support element 76 within the tailstock chuck, as movement of the element 146 to the left, FIG. 5, is limited by engagement of the element with the chuck portion 150. Movement of the element 146 to the right is limited by the engagement of the locating surfaces 152 and 154. However, during operation, the headstock and tailstock quills are so adjusted that axial locking of the workpiece occurs prior to engagement of these surfaces.

In operation, the expansible fluid motors 62 are retracted to move the actuator rods 60 and 60' in a direction away from the associated chuck. This motion retracts the pins 102 and 102', and also retracts the jaws 124 and 124'. The crankshaft workpiece 156 is inserted into the chucks through the access openings 56 and 56', and this loading of the chucks usually is accomplished through manual, automatic or semi-automatic transfer equipment. In the drawings the workpiece 156 is shown in broken lines and includes ends 158 and 160, center hole 162, bearing portions 164 and counterweight portions 166. The workpiece bearings 164 will engage the pillows 126 and 126', and the end 158 of the workpiece received within the tailstock chuck is provided with the conical center hole 162 accurately drilled to a predetermined depth and very accurately axially related to the bearings of the workpiece. Upon the workpiece being received upon the supporting pillows, the workpiece center hole 162 will be substantially aligned with the tailstock center 88 and end 160 will be received within cradle 148. The tailstock expansible motor 62 is actuated to shift the rod 60 to the left, FIG. 1, shifting the support element 76 from the position of FIG. 1, to the position of FIG. 2 wherein the center 88 engages the workpiece center hole 162, and is free to float radially in seeking the center of the hole. Translation of the rod 60 toward the center continues to occur until the plungers 120 release the locking pins 102 so that the cam surfaces 104 and 96 engage to hold the support element surface 98 in engagement with the chuck surface 100, as shown in FIG. 2. The movement of the actuator rod terminates as the plungers 74 radially inwardly translate the jaws 124 sufficiently to engage the crankshaft workpiece. Spring 84 is of sufficient strength so that the workpiece is shifted to the left by center 83 and the spring 149 (FIG. 5) will be compressed. Spring 149 maintains a biasing force of the workpiece toward center 88 as the jaws 124 clamp the workpiece.

At this time the headstock expansible motor and rod 60 are shifted to the right, FIG. 5, to release the locking pins 102', which engage the support element surface 96', and axially lock the support element 146, and crankshaft end 160 to the cradle 148. This action will insure full engagement of the workpiece centering hole 162 with the tailstock center 83 throughout the cycle producing the desired predetermined relationship between these components, and thus accurately axially positioning the workpiece 156 relative to the tailstock chuck, and the crankshaft machine. As the angle of the cam surfaces 96 and 104 is a "locking" angle with respect to axial forces the crankshaft is now positively locked with respect to axial displacement on the crankshaft machine, and the headstock expansible motor continues as it produces sufficient movement of the plungers 74' to operate jaws 124' inwardly to firmly engage the crankshaft workpiece. As the jaws are in axial alignment with the supporting pillows 126 and 126', and are disposed in opposed relation thereto, FIG. 3, the jaws tend to hold the workpiece on the pillows and further radially locate the workpiece with respect to the axis of headstock and tailstock spindle rotation. As the spindles 74 are axially displaced by the actuating rods and drive blocks rods the initial movement of the plungers causes the cam surface 138 to traverse the jaw cam surface 130 producing a rapid traverse inward movement of the jaws. Upon the cam surface 140 engaging the jaw surface 134 the velocity of inward movement of the jaws substantially decreases due to the difference in cam surface angle, and thus the final movement of the jaws is slow and produces a locking angle with a high pressure being produced on the workpiece providing an effective contact between the jaws and the workpiece.

The workpiece is now fully clamped and the workpiece crank arms 166 engage pads 168 on the chucks which impart the torque to the workpiece and the spindle drive is actuated and the machine is operated through its cutting cycle.

At the completion of the cutting cycle the spindles are stopped in the position such that the access openings 56 extend upwardly, or toward the workpiece transfer mechanism, and the expansible motors, and rods 60 and 60' are retracted. This retraction initially produces a slow withdrawal of the jaws from the workpiece until the plunger surfaces 144 engage the rapid traverse jaw surfaces 132 producing a rapid withdrawal of the jaws from the workpiece. Thereafter, as the plungers 120 reciprocate the cam surfaces 116 engage the pin cam surfaces 112 to withdraw the locking pins 102 and 102' from the associated support element. Thus, the support element 76 will be capable of moving away from the workpiece as soon as the locking pins have cleared the flange 94, and the workpiece may then be removed from the chucks by the transfer mechanism, and the cycle may be repeated.

As the plungers 74 are reciprocated through the equalizing bar 70, the forces imposed upon the jaws 124 will be equalized, and a uniform chucking and holding of the workpiece occurs. As the supporting element 76 is positively locked in a predetermined manner against the locating surface 100 of the tailstock chuck, the center 88 is accurately located with respect to the tailstock chuck for accurately axially locating the workpiece relative to the crankshaft machine, yet the apparatus permits the center 88 to be withdrawn from the workpiece center hole for unhindered insertion and removal of the workpiece from the chucks.

Figure 10:
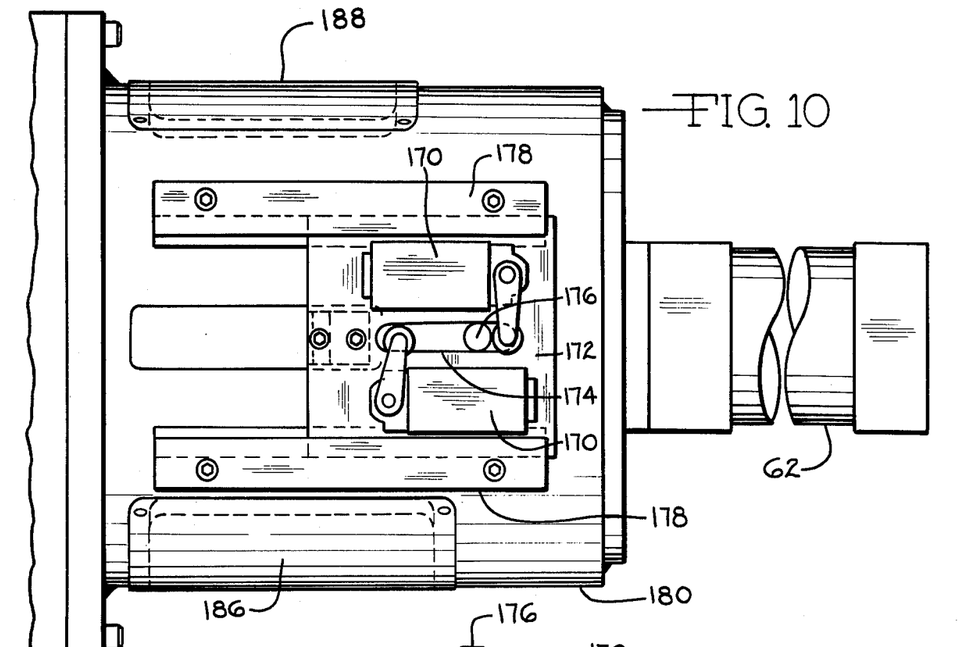
FIG. 10 is an elevational, detail view of the limit switch structure as taken along section X—X of FIG. 1.
Figure 11:
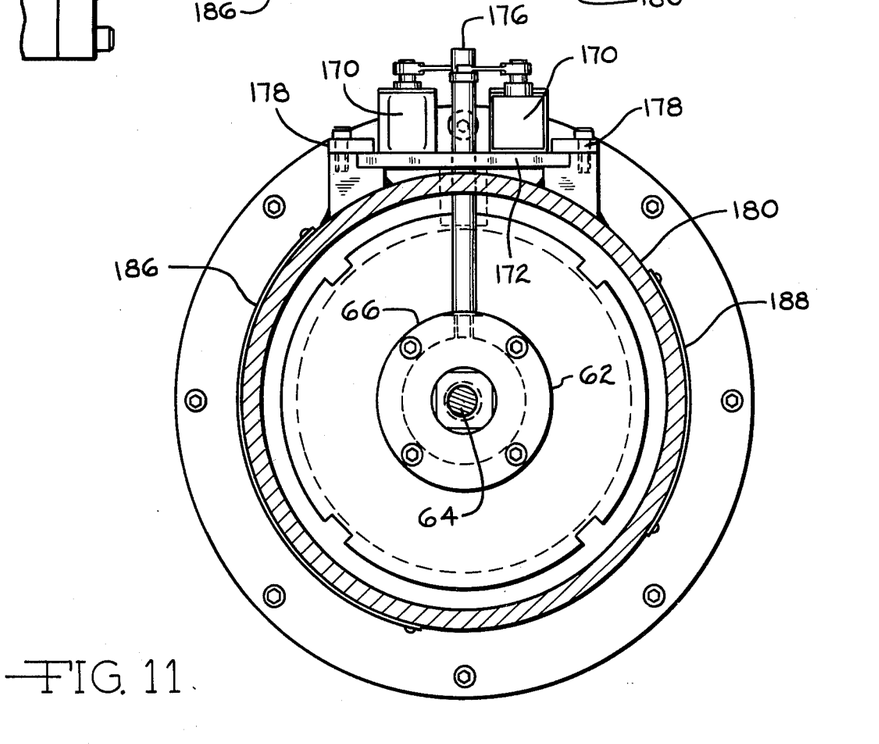
FIG. 11 is an elevational, sectional view of the tailstock structure as taken along section XI—XI of FIG. 1.

Control of the cycling of the machine, including actuation of the actuating fluid motors 62, includes a pair of electric limit switches 170 illustrated in FIGS. 1, 10 and 11. The limit switches 170 are mounted upon a carriage plate 172 having an elongated slot 174 centrally defined therein through which the control pin 176 extends, FIG. 1. The control pin 176 is mounted upon the rotary joint connection 66, FIG. 1, and thus reciprocates with the rod 60 in the axial direction of the rod during operation of the associated chuck.

The carriage plate 172 is mounted for adjustment in a pair of guides 178 affixed to the headstock and tailstock housings 180 having a slot through which pin 176 extends, and the guides 178 are parallel to the axis of the spindles and quills.

The carriage plate 172 includes a bracket 182 having a tongue 184 received within the groove 48 defined in the quill locking ring 46. Thus, it will be appreciated from FIG. 1 that the position of the carriage switch plate 172 is determined by the axial position of the locking ring 46. If spacers 38 and 42 are replaced with spacers of different lengths to accommodate a workpiece of different length, the position of the carriage plate 172 upon the housing 180 will also be automatically changed commensurate with the dimensions of the spacers, and in this manner the limit switches 170 are automatically positioned upon the crankshaft machine in accordance with the initial adjusting and set up of the quill position for a particular dimension of workpiece.

Of course, adjustment of the quill position only takes place between "runs" of particular sizes of crankshafts, and such adjustment of the quill does not occur between consecutive machined workpieces. Access to the locking rings and housing is through removable cover plates 186, FIG. 10.

It will be appreciated that various modifications to the inventive concept may be apparent to those skilled in the art without departing from the spirit and scope of the invention.

We claim:

1. Crankshaft positioning and chucking apparatus for crankshaft machines having a headstock and a tailstock for use with crankshafts having a centering hole defined in an end thereof axially related in a predetermined manner to crankshaft bearing surfaces to be machined comprising, in combination, a frame, a headstock spindle and a tailstock spindle rotatably mounted upon said frame in spaced opposed, coaxial relationship, a first chuck mounted upon said headstock spindle, a second chuck mounted upon said tailstock spindle a center located in one of said chucks for receiving a crankshaft centering hole for axially positioning a crankshaft received within said one chuck, center support means movably mounted within said one chuck for axial adjustment toward and away from the other chuck between a loading and unloading position and a machining position fixedly supporting said center, positioning means axially fixedly positioning said center support means at said machining position, crankshaft biasing means located in said other chuck biasing a crankshaft received therein toward said center, crankshaft holding means defined on each of said chucks, and actuating means associated with each spindle operatively connected to the associated holding means for selective actuation thereof.

2. In crankshaft positioning and chucking apparatus as in claim 1 wherein said biasing means includes a cradle defined on said other chuck receiving the opposite end of the crankshaft in which the centering hole is defined.

3. In crankshaft positioning and chucking apparatus as in claim 1 wherein said center support means and said crankshaft biasing means each include positioning means each mounted within their respective chuck for relative axial movement thereto, and positive locking means within each chuck associated with each positioning means selectively locking the associated positioning means against axial movement away from the crankshaft workpiece, and control means associated with said locking means selectively moving said locking means into locking and unlocking positions with respect to the associated positioning means.

4. In crankshaft positioning and chucking apparatus as in claim 3 wherein said locking means comprise radially movable pins slidably supported within said chucks and said control means include axially movable cam members slidably supported within said chucks, a cam surface defined on each pin engagable with a cam surface defined on each of said cam members, said cam members being connected to and movable by said actuating means.

5. In crankshaft positioning and chucking apparatus as in claim 1 wherein said crankshaft holding means comprise movable jaws slidably mounted in said chucks transversely disposed to the axis of rotation thereof, a first cam surface defined on said jaws, said actuating means including cam plungers movable in said chucks in a direction parallel to the axis of said spindles, a second cam surface defined on each of said plungers each engaging with a first cam surface whereby axial reciprocation of said plungers extends and retracts said jaws from the camshaft workpiece, said actuating means including motor means mounted on said spindles selectively reciprocating said plungers.

6. In crankshaft positioning and chucking apparatus as in claim 5 wherein each engaging first and second jaws include rapid transverse and slow transverse cam surfaces for imparting rapid and slow reciprocation of said bars during a constant rate of plunger reciprocation, and providing adequate jaw movement with minimum axial cam movement and providing a locking angle capable of imparting strong clamping forces.

7. Crankshaft positioning and chucking apparatus for crankshaft machines having a headstock and a tailstock comprising, in combination, a frame, a headstock spindle and a tailstock spindle rotatably mounted upon said frame in spaced opposed, coaxial relationship, a first chuck mounted upon said headstock spindle, a second chuck mounted upon said tailstock spindle, crankshaft holding means defined on each of said chucks, said holding means comprising at least one movable jaw slidably mounted in its associated chuck in a direction transverse to the axis of said spindles, said jaw having sides, a first elongated cam member defined on a jaw side by spaced opposed surfaces and obliquely related to the direction of jaw movement, at least one cam plunger slidably mounted in each chuck in a direction transverse to the direction of movement of the jaw mounted in the associated chuck, said plunger having sides, a second elongated cam member defined on a plunger side by spaced opposed surfaces having a length obliquely related to the direction of plunger movement, one of said cam members comprising a groove and the other said cam members comprising a projection slidably received within said groove, said first and second cam members thereby mating one within the other whereby reciprocation of said plunger produces a positive sliding reciprocating movement of the associated jaw in both crankshaft clamping and releasing directions, at least one of said first and second cam members including rapid traverse and slow traverse cam surfaces for imparting rapid and slow reciprocation to the associated jaw during a constant rate of plunger reciprocation, and motor means mounted on each spindle operatively connected to the associated plunger for selectively producing reciprocating movement thereof.

8. In crankshaft positioning and chucking apparatus as in claim 7, a pair of jaws and cam plungers slidably mounted in each chuck, an equalizing bar interconnecting the plungers mounted in a common chuck and pivotally connected to said motor means of the associated chuck whereby the reciprocating force of said motor means is substantially equally divided between said plungers.

* * * * *